C. VALLONE & F. R. ROGERS.
MACHINE FOR INSERTING NUTS OR DISKS IN TUBES.
APPLICATION FILED MAY 17, 1909.
970,669.
Patented Sept. 20, 1910.
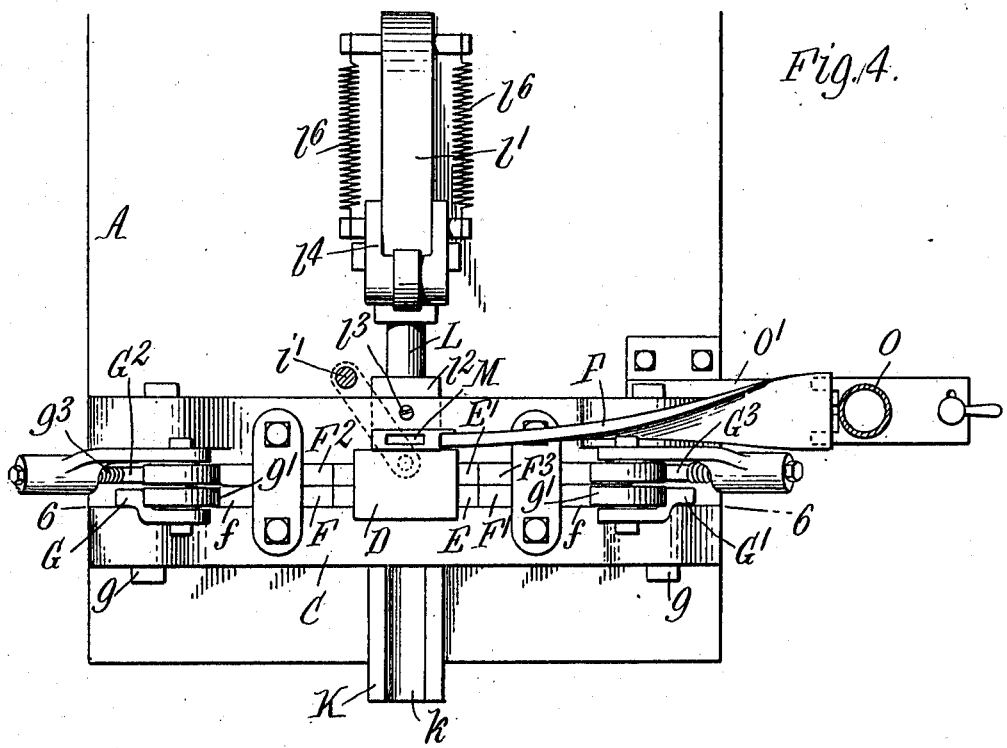
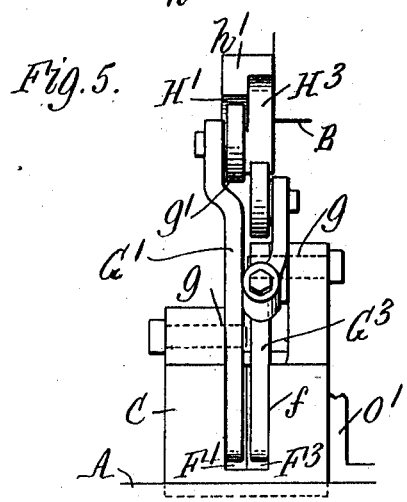

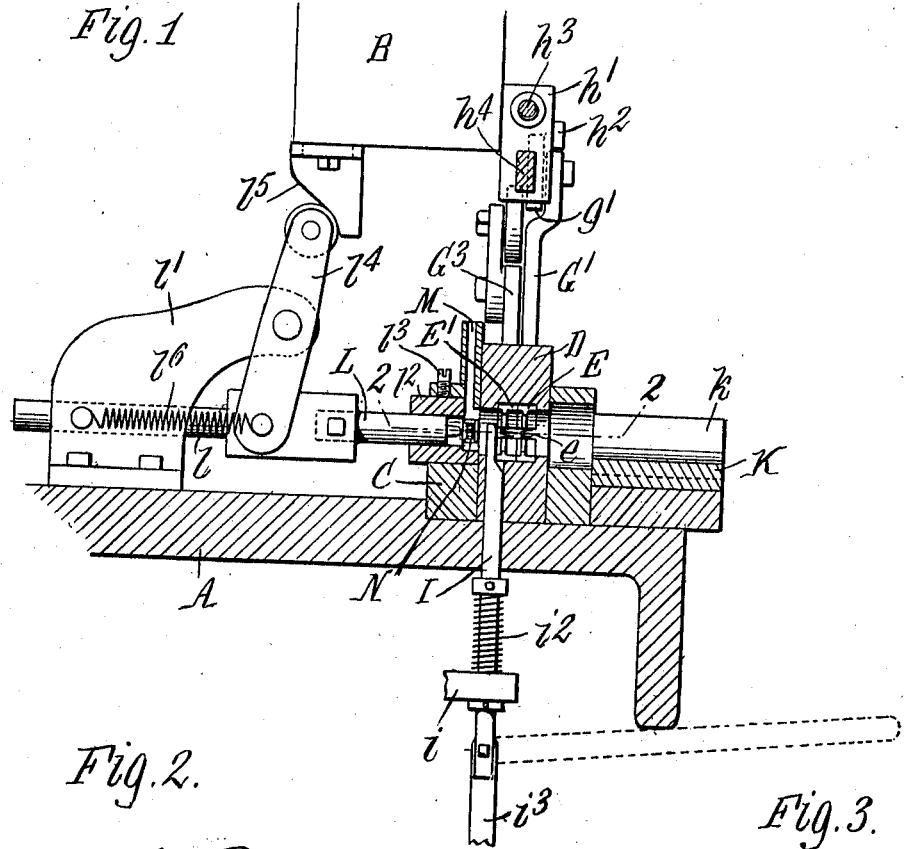
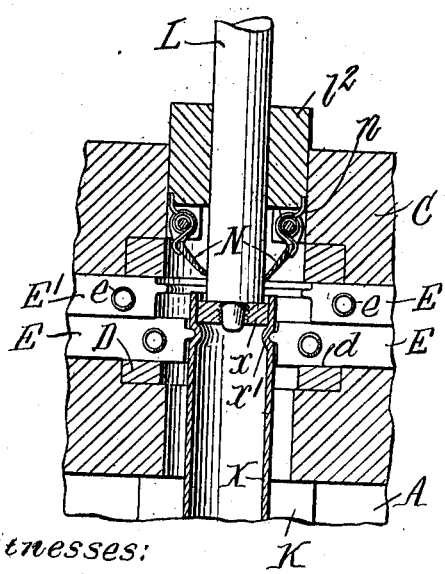
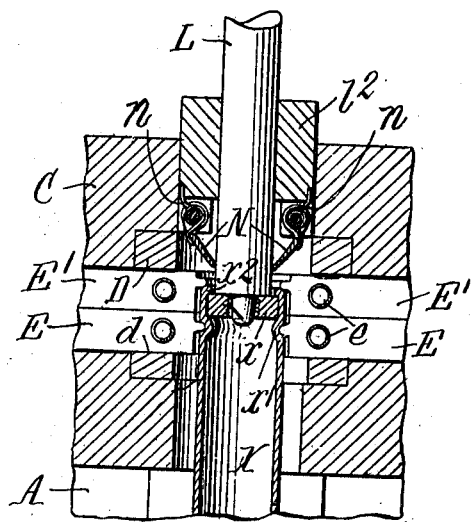

C. VALLONE & F. R. ROGERS.
MACHINE FOR INSERTING NUTS OR DISKS IN TUBES.
APPLICATION FILED MAY 17, 1909.
970,669.
Patented Sept. 20, 1910.
3 SHEETS—SHEET 3.
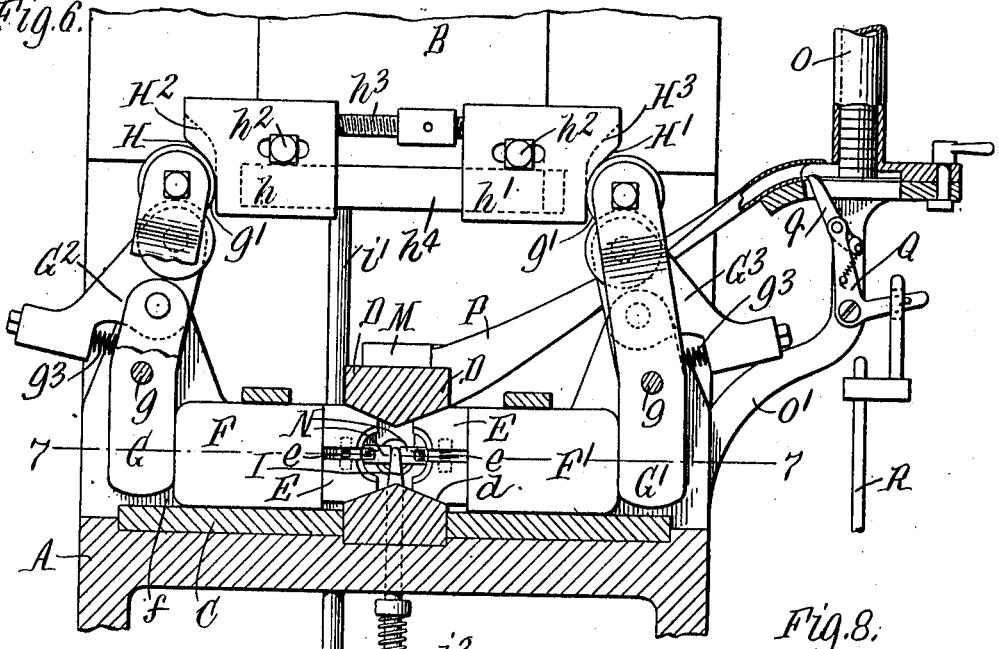
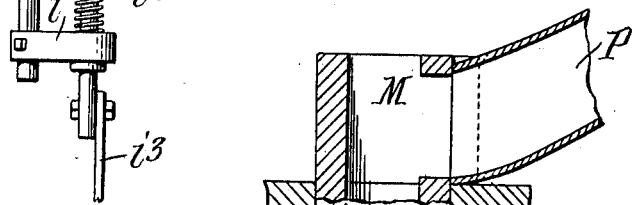
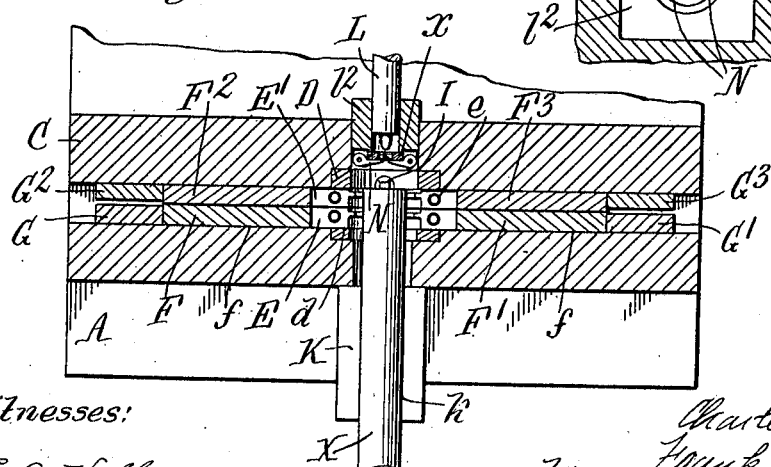
Witnesses:
E. A. Volk.
A. G. Dimond.
Inventors.
Charles Vallone,
Frank R. Rogers,
by Wilhelm, Parker & Hard,
Attorneys.

UNITED STATES PATENT OFFICE.

CHARLES VALLONE AND FRANK R. ROGERS, OF BUFFALO, NEW YORK, ASSIGNORS TO BARCALO MANUFACTURING COMPANY, OF BUFFALO, NEW YORK.

MACHINE FOR INSERTING NUTS OR DISKS IN TUBES.

970,669.

Specification of Letters Patent. Patented Sept. 20, 1910.

Application filed May 17, 1909. Serial No. 496,626.

*To all whom it may concern:*

Be it known that we, CHARLES VALLONE and FRANK R. ROGERS, citizens of the United States, residing at Buffalo, in the county of Erie and State of New York, have invented a new and useful Improvement in Machines for Inserting Nuts or Disks in Tubes, of which the following is a specification.

This invention relates to machines for securing nuts or perforated disks in the ends of tubes, the nuts being primarily intended for the engagement of screws for fastening knobs, devices, or cross tubes on the ends of the tubes containing the nuts.

The objects of the invention are to produce an efficient and desirable machine for this purpose, which is of simple construction and can be manufactured at a reasonable cost, and which can be easily operated to rapidly secure the nuts or disks in the tubes; and also to construct the machine so that it can be readily adjusted to operate upon tubes of different diameters.

Briefly stated, the operation of securing the nut or disk in the tube is as follows: The tube is squeezed or creased externally near its end by preliminary dies, so as to form an internal circumferential bead or shoulder, and while the tube is rigidly held by these preliminary dies a nut or disk is shoved into the end of the tube against the internal shoulder and the end of the tube is bent inwardly or squeezed at the outer side of the nut or disk by final dies so that the nut or disk is securely held between the internal shoulders or contracted portions of the tube. In the machine illustrated in the drawings, the mechanism for performing this work is applied to and operated by an ordinary clutch-controlled power press, the dies for creasing, indenting or squeezing the tube, and the plunger for forcing the nuts into the tube being operated through suitable instrumentalities by the press ram or plunger, but these operations could be performed in like manner by mechanism differently constructed or actuated. The nuts or disks can be fed to the operating mechanism by hand or automatically, the machine shown in the drawings being provided with feed mechanism for the nuts controlled by the treadle by which the action of the press is controlled.

In the accompanying drawings, consisting of three sheets: Figure 1 is a fragmentary transverse sectional elevation of a power press equipped with mechanism embodying the invention for securing nuts or disks in tubes. Fig. 2 is a fragmentary sectional plan view thereof, on an enlarged scale, in line 2—2, Fig. 1, showing a tube held by the primary die and a nut or disk in place in the tube. Fig. 3 is a similar view showing the tube after the end thereof has been squeezed to secure the nut. Fig. 4 is a plan view, partly in horizontal section, of the mechanism. Fig. 5 is a fragmentary elevation of one pair of the die operating levers and their actuating cams. Fig. 6 is a front elevation, partly in section, of the machine, in line 6—6, Fig. 4. Fig. 7 is a sectional plan view in line 7—7, Fig. 6. Fig. 8 is a fragmentary sectional elevation, on an enlarged scale, of the feed chute for the nuts or disks and the associated parts.

Like reference characters refer to like parts in the several figures.

X, Fig. 3 represents a tube, such as used in tubular metal bedstead frames, and $x$ is the nut or disk which is secured in the end of the tube by the machine embodying the invention of this application. The nut or disk is securely held in the tube between an internal bead $x'$ and the inturned edge $x^2$ of the tube formed by squeezing the tube.

A represents the bed or base of an ordinary clutch-controlled power press, and B the vertically reciprocating ram or plunger thereof.

C represents a base block which is suitably secured in a seat in the bed A of the press, and D is a die holder or block which is removably confined in a vertical recess in the base block C. This die block is provided with a transverse opening into which the end of a tube is adapted to be inserted and with a longitudinal intersecting cavity $d$ in which preliminary and final dies E and E' respectively are confined and are movable horizontally to crease or squeeze the tube. Each of the dies E and E' (see Fig. 6) consists of four wedge-shaped sections arranged in opposite pairs and having inclined edges which slide against correspondingly inclined or converging faces at the top and bottom of the die cavity $d$ in the die block D, so that by forcing the opposite pairs inwardly toward each other the die will be contracted about the tube in the tube opening of the die block. A spring $e$ arranged between the sections of each pair tends to spread the same to expand the die. The inner ends of the die sections have segmental ribs adapted, when the die is contracted about the tube, to form a circumferential crease therein or squeeze the tube. The preliminary and final dies are substantially alike and they could be employed for forming circumferential creases in the tube at opposite sides of the nut or disk, but the nut or disk is usually secured in the end of the tube and the final die simply turns in or squeezes the extreme end of the tube at the outer side of the nut or disk.

The sectional dies are contracted to press the tube as follows: F and F′ represent plungers arranged to slide horizontally in guide ways $f$ in the base block C at opposite sides of the die block, each plunger bearing at its inner end against one pair of the sections of the preliminary die. Levers G G′ suitably fulcrumed at $g$ on the base block C with their lower ends bearing against the outer ends of the plungers F F′, are provided at their upper ends with anti-friction rollers $g'$ arranged in the path of cam faces H H′ on the press ram B. When the press ram descends the cam faces H H′ engage the lever rollers and spread the upper ends of the levers, thus moving the lower ends inwardly and forcing the plungers F F′ toward each other to contact the sectional die E. The final die E′ is similarly operated by plungers $F^2$ $F^3$, levers $G^2$ $G^3$ and cam faces $H^2$ $H^3$ on the press ram. The relation between the die operating levers and their actuating cam faces is such that when the ram descends the preliminary die will be actuated first, and the final die will not be operated until after the nut or disk has been inserted in the tube against the bead or shoulder $x'$ formed by the preliminary die. The levers $G^2$ and $G^3$ for the final die preferably consist of jointed sections with interposed springs $g^3$ (see Figs. 5 and 6) whereby the pressure on the tube is transmitted through these springs, which act as safety devices to prevent injury to the machine in the event of a nut or disk being improperly placed in the tube, so that the final die engages the tube opposite to the nut or disk and is thus prevented from contracting to its normal extent. The cam faces H $H^2$ and H′ $H^3$ are formed on blocks $h$ and $h'$, respectively, which are adjustbly secured on the press ram for enabling the cam faces to be adjusted as required to cause the proper action of the dies. As shown, the cam blocks $h$ $h'$ are secured on the ram by clamp screws $h^2$ and are adjusted by a right and left-hand threaded adjusting screw $h^3$ arranged between them, the blocks being guided by a bar $h^4$ sliding in slots in the two blocks, see Fig. 6. Dies such as described, could be operated by the press ram through other suitable mechanism, or different means for creasing or squeezing the tube as described could be employed.

I represents an end gage against which the end of the tube is placed when inserting it in the die block to insure the creasing or squeezing of the tube at the proper points. This end gage consists of an upright rod extending up through vertical holes in the bed of the press and the die block D with its upper end normally projecting into the tube opening of the die block. The gage rod is connected below the bed of the press to an arm $i$ projecting from an upright rod $i'$ which extends vertically through a hole in the bed of the press and is secured at its upper end to the press ram. The gage rod I preferably passes loosely through a hole in the arm $i$ and a spring $i^2$ is interposed between the arm $i$ and a collar on the gage rod, which permits the gage rod to be lowered to retract its upper end from the tube opening in the die block independently of the operation of the press. A lever $i^3$, Fig. 1, pivoted to the lower end of the gage rod and adapted to be swung upwardly so as to bear against the flange of the press bed, affords an easy means for thus lowering the gage rod I.

K represents a tube rest mounted on the press bed in front of the base block C and having a seat $k$ in which the tube is held with its inner end in the die block against the end gage. The rest is detachable to permit different rests to be employed when operating on tubes of different diameters. Any other suitable gage and rest, or means, for holding the tube in proper position for the operation of the dies could be employed.

L represents a plunger for pushing the nut or disk into the end of the tube. This plunger is arranged to reciprocate horizontally into and out of the end of the tube which is held in the dies and is provided at its front end with a central stud adapted to enter the hole in the nut to hold the nut in position as it is moved into the tube by the plunger. The plunger is detachably secured to a rod $l$ which slides fore and aft of the press in a bearing opening in a bracket $l'$ secured on the press bed, and is guided by a sleeve $l^2$ which is secured by a set screw $l^3$, Fig. 1, or other means, in an opening in the base block C in alinement with the tube opening in the die block.

$l^4$ is a lever pivoted on the bracket $l'$ and connected at one end to the plunger rod and provided at its other end with a roller arranged in the path of a cam $l^5$ secured to the press ram. When the press ram descends the cam $l^5$ engaging the roller moves the upper end of the lever rearwardly and throws its lower end forwardly and advances the plunger L. Suitable springs $l^6$ connected to the lever and the bracket on which it is fulcrumed serve to retract the plunger, when the press ram ascends. Other suitable means for operating the plunger could be employed. The plunger normally stands with its stud in rear of a vertical open-ended chute M through which the nuts can be dropped into the plunger guide opening in front of the plunger. This chute is held in a vertical hole in the base block C and the upper side of the plunger guide sleeve $l^2$ is cut away beneath the chute to permit the nut or disk to drop into the plunger guide opening.

N, Figs. 2, 3, 7 and 8, represent yielding retaining fingers which are pivoted on the plunger guide sleeve $l^2$ at opposite sides thereof and are normally held so as to project transversely into the plunger guide opening, as shown in Figs. 7 and 8, by suitable springs $n$. The nut or disk is dropped into the plunger guide sleeve, which affords a seat therefor, between the end of the plunger and the retaining fingers, and when the plunger is advanced the fingers retain the nut or disk upright until the stud is projected into the hole in the nut or disk, after which the plunger pushes the nut forwardly between the fingers N, which swing laterally to permit the passage of the nut or disk. The nuts or disks can be dropped into position in front of the plunger by hand, if desired, but mechanism for automatically feeding the nuts to the plunger is shown in the drawings, which is constructed as follows:

Q, Fig. 6, represents a vertical magazine tube for the nuts or disks, supported by a suitable bracket O′ secured to the press, and P is an inclined twisted chute leading from the magazine to the vertical chute M. The nuts or disks are fed from the bottom of the stack in the magazine into the inclined chute one at a time by a lever Q pivoted below the magazine and provided with a spring-operated feed dog $q$ which projects into the lower end of the magazine through a slot in the supporting bracket therefor. The feed lever Q is connected by a rod R to the treadle (not shown) by which the press is operated. When the treadle is depressed to start the press the feed lever is swung to place the feed dog $q$ back of the bottom nut or disk in the magazine, and when the treadle is released the feed lever will be thrown forward to the position shown in Fig. 6 and will move a nut or disk from the magazine into the feed chute, through which it will slide into the seat in front of the plunger L which inserts it into the tube.

The operation of the machine is as follows: Assuming the parts to be in the position shown in Figs. 1, 4 and 6, with a nut or disk in position in front of the inserting plunger L and a tube in place with its end in the die block as shown in Fig. 7, the operative depresses the press treadle, which starts the press and causes the ram B to descend in the usual manner. The preliminary die E is first operated to squeeze or crease the tube by the engagement of the cams H H′ with the levers G G′. While the tube is held by the preliminary die the cam $l^5$ operates the lever $l^4$ and advances the plunger L to push the nut or disk into the tube against the internal bead or shoulder formed by the preliminary die, the gage rod F having been retracted from in front of the plunger by the descent of the ram, as explained. The cams $H^2$ $H^3$ then engage the levers $G^2$ $G^3$ and contract the final die so as to squeeze the end of the tube at the outer side of the nut or disk and secure it in the tube. The depression of the treadle swings the feed lever Q to position to engage the bottom nut or disk in the magazine, and when the treadle is released and returned to its initial position the feed lever Q is swung to feed another nut or disk into position to be inserted in the tube, in the manner explained. As in the ordinary clutch-controlled press, the operation of the ram continues if the treadle is held down, so that by holding the treadle down the operative can, if desired, subject each tube to two or more pressures by the dies. As a new nut or disk is not fed to the inserting plunger until the treadle is released, the continued operation of the ram and the inserting plunger does not, of course, interfere with the successive squeezing operations of the dies.

To adapt the machine for operation on tubes of a different size from those upon which it has been operating, the dies E and E′ are removed and replaced by others of proper size for the new tubes. The tube rest K, plunger L and its guide sleeve $l^2$ and the chute M are also replaced by corresponding parts of the proper size to insure the proper alinement of the tube and nut or disk and position of the former relative to the dies.

We claim as our invention:

1. In a machine for securing nuts or disks in tubes, the combination of means for forming an internal shoulder in the tube, means for inserting the nut or disk into the tube aginst said shoulder, means for bending inwardly the tube at the outer side of the nut or disk for securing the nut or disk against said internal shoulder, and mechanism for operating said means in succession in the order mentioned, substantially as set forth.

2. In a machine for securing nuts or disks in tubes, the combination of means for creasing the tube to form therein an internal circumferential shoulder, means for inserting the nut or disk in the tube against said shoulder, means for turning in the end of the tube at the outer side of the nut or disk, and mechanism for operating said means in succession in the order mentioned, substantially as set forth.

3. In a machine for securing nuts or disks in tubes, the combination of a preliminary die for squeezing the tube to form therein an internal shoulder, means for inserting the nut or disk into the tube against said shoulder, a final die for squeezing the tube at the outer side of the nut or disk, and mechanism for operating said dies and means in succession in the order mentioned, substantially as set forth.

4. In a machine for securing nuts or disks in tubes, the combination of a preliminary contractible die for squeezing the tube to form therein an internal shoulder, means for inserting the nut or disk into the tube, a final contractible die for squeezing the tube at the outer side of the nut or disk, and mechanism which operates first to contract the preliminary die to squeeze and hold the tube, then to actuate the means for inserting the nut or disk, and then to contract the final die on the tube, substantially as set forth.

5. In a machine for securing nuts or disks in tubes, the combination with a press having a reciprocating ram, of a preliminary die for squeezing the tube to form therein an internal shoulder, means for inserting the nut or disk into the tube against said shoulder, a final die for squeezing the tube at the outer side of the nut or disk, and mechanism actuated by the press ram for operating said dies and means in succession in the order mentioned, substantially as set forth.

6. In a machine for securing nuts or disks in tubes, the combination of a rest for holding the tube, a preliminary die for squeezing the tube to form therein an internal shoulder, a plunger for pushing the nut or disk into the tube against said shoulder, a final die for squeezing the tube at the outer side of the nut or disk, and mechanism for operating said dies and plunger in succession in the order mentioned, substantially as set forth.

7. In a machine for securing nuts or disks in tubes, the combination of a rest for the tube, an end gage for the tube, a preliminary die for squeezing the tube to form therein an internal shoulder, a plunger for pushing the nut or disk into the tube, a final die for squeezing the tube at the outer side of the nut or disk, and mechanism for operating said dies and plunger and retracting said end gage, substantially as set forth.

8. In a machine for securing nuts or disks in tubes, the combination of a rest for the tube, a preliminary die for squeezing the tube to form therein an internal shoulder, a plunger for pushing the nut or disk into the tube, yielding devices for retaining the nut or disk in position in front of said plunger, a final die for squeezing the tube at the outer side of the nut or disk, and mechanism for operating said dies and plunger, substantially as set forth.

9. In a machine for securing nuts or disks in tubes, the combination with a press having a reciprocating ram, of a preliminary die for squeezing the tube to form therein an internal shoulder, means for inserting the nut or disk into the tube, a final die for squeezing the tube at the outer side of the nut or disk, operating levers for said dies and nut inserting means, and cams on the press ram arranged to engage and actuate said levers to first operate the preliminary die, then insert the nut or disk in the tube and then operate the final die, substantially as set forth.

10. In a machine for securing nuts or disks in tubes, the combination of a preliminary die for squeezing the tube to form therein an internal shoulder, means for inserting the nut or disk into the tube, a final die for squeezing the tube at the outer side of the nut or disk, mechanism for operating said dies and means, and mechanism for feeding the nuts or disks to the inserting means, substantially as set forth.

11. In a machine for securing nuts or disks in tubes, the combination of dies arranged side by side lengthwise of the tube, means for inserting the nut or disk in the tube, and means for operating said dies to squeeze the tube at opposite sides of the nut or disk to form internal raised portions on the tubes to secure the nut or disk in the tube, substantially as set forth.

12. In a machine for securing nuts or disks in tubes, the combination of a rest for the tube, means for supporting a nut or disk opposite to the end of the tube, means for feeding a nut or disk to said nut-supporting means, preliminary and final dies between which the tube is held and which are movable toward the tube, and connected mechanism for operating said feeding means, actuating said preliminary die to form an internal shoulder in the tube, then actuating said plunger to insert a nut or disk into the tube against said internal shoulder, and then actuating said final die for contracting the tube at the outer side of the nut or disk, substantially as set forth.

Witness our hands, this 13th day of May, 1909.

CHARLES VALLONE.
FRANK R. ROGERS.

Witnesses:
A. W. KIRTON,
C. L. HYSLOP.